(12) United States Patent
Speed et al.

(10) Patent No.: US 11,665,379 B2
(45) Date of Patent: May 30, 2023

(54) RENDERING IMAGE CONTENT AS TIME-SPACED FRAMES

(71) Applicant: Photo Sensitive Cinema (PSC), Hanscom AFB, MA (US)

(72) Inventors: Matthew Gregory Speed, Burke, VA (US); Dennis Paul Butler, Evans City, PA (US)

(73) Assignee: Photo Sensitive Cinema (PSC), Hanscom AFB, MA (US)

( * ) Notice: Subject to any disclaimer, the term of this patent is extended or adjusted under 35 U.S.C. 154(b) by 130 days.

(21) Appl. No.: 17/105,290

(22) Filed: Nov. 25, 2020

(65) Prior Publication Data

US 2021/0160557 A1  May 27, 2021

Related U.S. Application Data

(60) Provisional application No. 62/940,298, filed on Nov. 26, 2019.

(51) Int. Cl.
*H04N 21/2343* (2011.01)
*H04N 21/472* (2011.01)
(Continued)

(52) U.S. Cl.
CPC ........... *H04N 21/234381* (2013.01); *H04N 21/41407* (2013.01); *H04N 21/45455* (2013.01); *H04N 21/47217* (2013.01)

(58) Field of Classification Search
CPC ..... H04N 21/234381; H04N 21/41407; H04N 21/44008; H04N 21/440281; H04N 21/4532; H04N 21/4542; H04N 21/45455; H04N 21/45457; H04N 21/4717; H04N 21/8193; H04N 21/8456; H04N 1/00; H04N 3/00; H04N 5/00; H04N 7/00; H04N 9/00; H04N 11/00; H04N 13/00; H04N 17/00; H04N 19/00; H04N 21/00; H04N 2101/00; H04N 2201/00; H04N 2209/00; H04N 2213/00
See application file for complete search history.

(56) References Cited

U.S. PATENT DOCUMENTS 8,526,506 B1 * 9/2013 Xie ................. H04N 19/86
375/240.26
9,743,010 B1 * 8/2017 Edwards ............. H04N 5/2357
(Continued)

*Primary Examiner* — Peter D Le
(74) *Attorney, Agent, or Firm* — Fish & Richardson P.C.

(57) ABSTRACT

Methods, systems, and apparatus, including a media player and computer-readable mediums, are described for rendering media content at a frame rate that is safe to a user. A system, or its media player, obtains media content that includes video content having multiple frames. The system determines a frame rate representing a rate for sequentially displaying the frames to the user when the media player plays the media content. Image content of each frame is scanned and data describing different photosensitivity thresholds is obtained. Based on a photosensitivity of the user, the system determines that one or more frames in a portion of the media content include image content that is unsafe to the user when the media player plays the media content. The system selectively decreases a frame playback rate for the portion of the media content as a function of an input value that is selectable by the user.

20 Claims, 7 Drawing Sheets

(51) Int. Cl.
*H04N 21/414* (2011.01)
*H04N 21/4545* (2011.01)

(56) References Cited

U.S. PATENT DOCUMENTS

| | | | | |
|---|---|---|---|---|
| 9,840,256 | B1* | 12/2017 | Valois | G05D 1/021 |
| 9,841,763 | B1* | 12/2017 | Valois | G05D 1/0257 |
| 10,200,599 | B1* | 2/2019 | Baldwin | H04N 5/2258 |
| 10,552,667 | B1* | 2/2020 | Bogan, III | G06T 15/205 |
| 10,694,083 | B1* | 6/2020 | Thomas | G03B 17/566 |
| 10,810,427 | B1* | 10/2020 | Ebrahimi Afrouzi | G06T 7/12 |
| 10,848,712 | B1* | 11/2020 | Rao | H04N 21/4307 |
| 2003/0014419 | A1* | 1/2003 | Clapper | G06F 11/1402 |
| 2003/0038807 | A1* | 2/2003 | Demos | G11B 27/3036 |
| 2003/0234892 | A1* | 12/2003 | Hu | H04N 9/642 |
| | | | | 348/E9.038 |
| 2006/0282867 | A1* | 12/2006 | Mizuhashi | H04N 21/4854 |
| | | | | 348/E17.005 |
| 2008/0051642 | A1* | 2/2008 | Krupnik | A61B 1/041 |
| | | | | 600/302 |
| 2009/0135918 | A1* | 5/2009 | Mak-Fan | H04N 21/4341 |
| | | | | 375/E7.2 |
| 2009/0273712 | A1* | 11/2009 | Landy | G11B 27/34 |
| | | | | 348/E9.034 |
| 2012/0023518 | A1* | 1/2012 | Meuninck | H04N 21/42203 |
| | | | | 340/5.82 |
| 2012/0143020 | A1* | 6/2012 | Bordoley | A61B 5/1114 |
| | | | | 600/383 |
| 2012/0144336 | A1* | 6/2012 | Pinter | H04N 7/148 |
| | | | | 709/224 |
| 2012/0173976 | A1* | 7/2012 | Herz | G06F 3/04815 |
| | | | | 715/716 |
| 2012/0187838 | A1* | 7/2012 | Hanna | G06V 10/143 |
| | | | | 315/76 |
| 2012/0240161 | A1* | 9/2012 | Kuo | H04N 21/64322 |
| | | | | 725/37 |
| 2014/0078398 | A1* | 3/2014 | Shenoy | G06T 13/205 |
| | | | | 348/515 |
| 2014/0164596 | A1* | 6/2014 | Hoctor | H04L 43/0894 |
| | | | | 709/224 |
| 2014/0333744 | A1* | 11/2014 | Baym | G08B 21/245 |
| | | | | 348/77 |
| 2014/0371599 | A1* | 12/2014 | Wu | A61B 5/0022 |
| | | | | 600/476 |
| 2015/0112232 | A1* | 4/2015 | Quatieri | A61B 5/7264 |
| | | | | 600/595 |
| 2015/0127340 | A1* | 5/2015 | Epshteyn | G10L 21/00 |
| | | | | 704/235 |
| 2015/0235668 | A1* | 8/2015 | Takabayashi | G11B 27/007 |
| | | | | 386/207 |
| 2015/0338915 | A1* | 11/2015 | Publicover | G06V 40/197 |
| | | | | 345/633 |
| 2015/0363928 | A1* | 12/2015 | Mestha | G01J 5/025 |
| | | | | 382/128 |
| 2016/0027174 | A1* | 1/2016 | Kang | G06T 11/001 |
| | | | | 382/130 |
| 2017/0127127 | A1* | 5/2017 | Zavesky | G06T 5/50 |
| 2017/0164052 | A1* | 6/2017 | Price | H04N 21/25883 |
| 2019/0341001 | A1* | 11/2019 | Mafoodh | G09G 5/10 |
| 2021/0000339 | A1* | 1/2021 | Neice | A61B 3/0025 |

* cited by examiner

RENDERING IMAGE CONTENT AS TIME-SPACED FRAMES

CROSS-REFERENCE TO RELATED APPLICATION

This application claims the benefit of U.S. Provisional Application No. 62/940,298, filed Nov. 26, 2019, the contents of which are incorporated by reference herein.

BACKGROUND

This specification relates to rendering image and video content at a display of an electronic device.

In a world dominated by computing devices the awareness and concern of photosensitivity has increased, particularly with the wide availability of devices that enable video streaming and display of visual content. In general, photosensitivity can induce an epileptic response or reaction. More specifically, medical data indicates 1 out of 100 people worldwide have diagnosed epilepsy. Further, 3% of these individuals have photosensitivity which can induce an epileptic reaction. Of the 7.53 billion people around the world, approximately 75.3 million people have epilepsy, with approximately 2.3 million people having some form of photosensitivity that induces an epileptic reaction.

An additional 200,000 people are diagnosed with epilepsy every year, with some data indicating that children and adolescents are more prone to photosensitivity (girls 60%, boys 40%). In the U.S., approximately 1.5% of the population between the ages of 5 and 17 have abnormal responses to light stimulation. Further, studies indicate that 26% of the world's population is under the age of 15 and 90% of people with Juvenile Myoclonic Epilepsy have photosensitivity. These approximations do not include the roughly 800,000 Americans who may be unaware of their respective photosensitivity. These numbers continue to grow daily based on the world's dependence on video streaming devices.

SUMMARY

This document describes techniques for rendering video content as time-spaced frames at a rate that is safe to users with a particular level of photosensitivity. The rate may be adjusted automatically during playback of the video content based at least on an input parameter that is selectable by the user, either at the playback device itself or as part of a video subscription preference selection. The user-selectable input allows for mitigating or eliminating a likelihood of a physiological or epileptic response in a user that has a medical sensitivity to certain types of recurring light or light patterns. In some cases this medical condition or sensitivity is triggered in response to the user viewing an iterative output of image frames that respectively include displays of contrasting light and dark content. For example, the user may have a medical condition such as photosensitive epilepsy in which flashing lights or contrasting light and dark patterns are triggers that cause the user to experience a seizure.

The described techniques can be used to implement a computing system or device that accesses media content having both audio and video content. The system may present the media content to the user via methods such as streaming or downloading. A media player may be included as a component device of the system and interface with a control file that defines a processing algorithm. The control file can specify different photosensitivity thresholds and include programmed instructions for generating a graphical interface with different user-selectable controls. The media player uses the control file to process respective image content in each of the multiple frames that make up the video content.

In response to processing the image content of the frames, the system computes various sets of parameter values that are descriptive of different reoccurring light and light patterns among the image content of the frames. The system can compare different combinations of the parameters against the different photosensitivity thresholds of the control file. The system can determine a safe video frame rate based on the output of this comparison and a user-selectable input that indicates the user's photosensitivity. Thus, the system is configured to determine a safe video frame rate relative to a user's photosensitivity and then selectively decrease a frame playback rate for certain portions of the media content as a function of an input value that is selectable by the user.

One aspect of the subject matter described in this specification can be embodied in a method of rendering media content. The method includes obtaining media content that includes video content. The video content includes multiple frames. The method includes obtaining input from a user and rendering the media content for the user while adjusting a frame playback rate for the video content based on both the input from the user and a changing characteristic of the video content. These and other implementations can each optionally include one or more of the following features. For example, in some implementations, the changing characteristic of the video content is a changing color ratio or a changing color saturation of one or more frames in the video content. In some implementations, the changing characteristic of the video content is a changing pixel intensity of pixels in a frame of the video content. The input triggers selection of a photosensitivity threshold that is compared to a parameter value that represents the changing characteristic of the video content.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation causes the system to perform the actions. One or more computer programs can be so configured by virtue of having instructions that, when executed by a data processing apparatus, cause the apparatus to perform the actions.

The subject matter described in this specification can be implemented in particular embodiments so as to realize one or more of the following advantages. The techniques described in this document enable users with different levels of photosensitivity to visual light patterns to avoid experiencing an epileptic reaction that can be triggered in response to the user's viewing of certain visual content that is iteratively displayed to the user at a rapid frame rate.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system having a media player that processes and renders media content at a frame rate that is safe to a user. The system, or its media player, obtains media content that includes video and audio content. The video content includes multiple frames. The system determines a frame rate representing a rate at which the frames are sequentially displayed to the user when the media player plays the media content. Image content of each frame is scanned and data describing different photosensitivity thresholds is accessed. Based on a photosensitivity of the user, the system determines that one or more frames in a portion of the media content include image content that is unsafe to the user when the media player plays the media content.

The system causes the media player to render the portion of media content as time-spaced frames at a frame rate that is safe to the user based at least on a user-selectable input parameter. For example, the system selectively decreases a frame playback rate for the portion of the media content as a function of a parameter value of the input that is selectable by the user. In this context "safe" represents a threshold rate of displaying a sequence of video frames such that the respective image content of two or more video frames do not appear as flashing lights or strobe effects that trigger an involuntary physiological reaction in a user as a result of the user's visual sensitivity to certain types of light effects. In some implementations, the system can automatically decrease the frame playback rate by referencing different photosensitivity thresholds without processing the user-selectable input.

Figure 1:
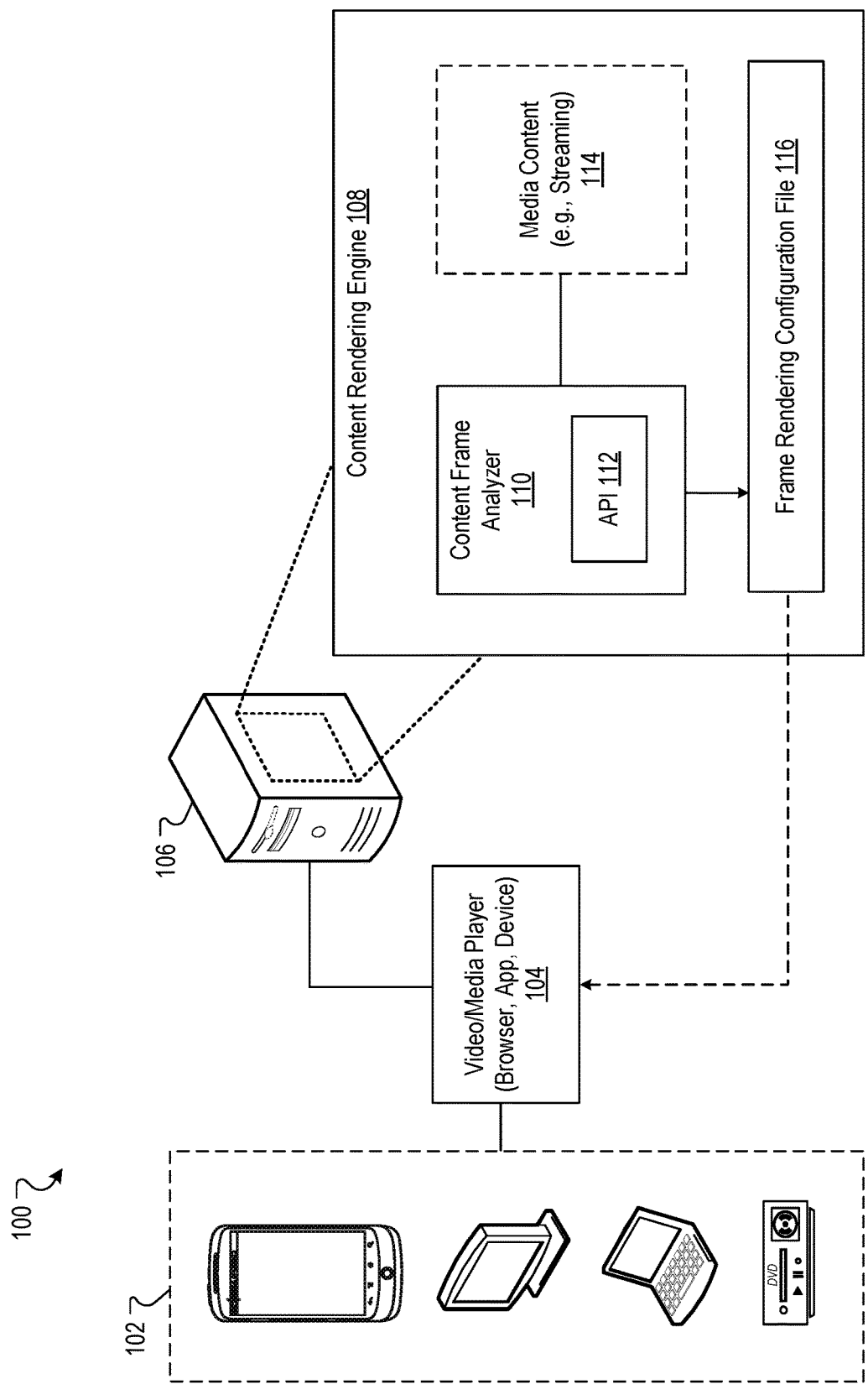
FIG. 1 is a block diagram of an example computing system used to render image content as time-spaced frames.

FIG. 1 shows a block diagram of an example computing system 100 ("system 100") used to render image content as time-spaced frames. In general, image content can correspond to at least an item or region of an individual video frame. For example, a frame that includes content depicting a grassy plain with mountains and a partly cloudy sky, can include image content for different regions of the grassy plain, image content for different mountains or regions/sections of the mountains, and image content for the partly cloudy sky or different regions of the sky.

System 100 can include one or more computing devices 102, a media player, and a computing server. In the example of FIG. 1, the computing device 102 ("device 102") can be a smartphone, a laptop computer, a smart television, a DVD player or similar hardware media playing device, a gaming console, a tablet computer, or any client device capable of outputting media content 114 for display to a user. In some implementations, the device 102 is a "smart" device that is capable of receiving data from a local or wide area network (LAN/WAN).

The device 102 can be a smart device that receives data from a local, or remote, network-connected server. For example, the device 102 includes a wired/wireless local area network (WLAN) interface that enables the device to receive data via the internet. The data represents media content that includes audio content and video content. The video content is based on a collection of individual video frames that each include respective items of image content. The device 102 includes a media player 104 that is used to output the media content at a display of the device. For example, the media player 104 can sequentially present, output, or otherwise display image content of the individual frames at a digital or electronic display of the device 102.

The device 102 includes, or is configured to access, a web browser or related application program that integrates the media player 104. In some examples, the media player 104 is implemented as a cross-platform media player software, a streaming media server, or both. For example, the media player 104 may be a proprietary web-based media player that is accessible via a website such as www.exampeflix-.com. The media player 104 may also be an application program (e.g., the ExampleFlix App) that is downloaded to the device 102 via a web site or an online application store. Once downloaded, the application program can be launched via the device 102 to access, stream, or download media content 114 from a streaming media server maintained by exampleflix.com.

In some implementations, the media player 104 is integrated in the device 102, such that the device 102 may be referred to alternatively as a media player. In some other implementations, the media player 104 is a standalone hardware device (e.g., a gaming console or DVD player) that communicates with the device 102 by way of a wired or wireless connection. Irrespective of the implementation, the device 102 and/or the media player 104 provides functionality for playing back media content 114 such as digital video data from media such as optical discs, as well as from files of appropriate formats such as MPEG, AVI, Real Video, and QuickTime. The device 102 and/or the media player 104 can also provide functions such as playing, pausing, stopping, rewinding, and forwarding, some common functions include zooming/full screen, audio channel selection, subtitle selection, and frame capturing.

The computing server 106 ("server 106") is configured to implement various computing functions of the system 100 that are described herein. Server 106 is configured to access or provide different types of media content 114 as well as provide control functionality for processing the media content 114. In the example of FIG. 1, the server 106 includes, or is configured to access, a content rendering engine 108 (described below). In some implementations, server 106 can include one or more computing nodes or node clusters that are used to perform the computational and/or machine learning processes, as described in more detail below.

In addition to the server 106, the system 100 may further include multiple computers, computing servers, and other computing devices that each include processors or processing devices and memory that stores compute logic or software/computing instructions that are executable by the processors. In some implementations, the compute logic or software/computing instructions that are executable by the processors include frame analysis logic of the content rendering engine 108, which is described in more detail below.

In general, the server 106 can include one or more processors, memory, and data storage devices that collectively form one or more computing apparatus of server 106. Processors of the computing apparatus process instructions for execution by server 106, including instructions stored in the memory or on the storage device to display graphical information for a graphical user interface (GUI) on an example display of, for example, device 102. Execution of the stored instructions can cause one or more of the actions described herein to be performed by server 106. In other implementations, multiple processors may be used, as appropriate, along with multiple memories and types of memory. For example, server 106 may be connected with multiple other computing devices and apparatus, with each device (e.g., a server bank, groups of servers, modules, or a multi-processor system) performing portions of the actions or operations associated with the various processes or logical flows described in this specification.

The content rendering engine 108 includes a frame analyzer 110 that is operable to analyze the respective content of each individual frame of media content 114. The content rendering engine 108 can be included within server 106 as a sub-system of hardware circuits that includes one or more processor microchips. The content rendering engine 108 includes programming logic for obtaining or accessing the media content 114. For example, the programming logic can be an application programming interface (API) 112 that facilitates accessing media content 114 by way of interfacing with the media player 104. In general, computing logic of server 106 or the content rendering engine 108 includes software instructions for instantiating one or more APIs (e.g., API 112) that are associated with the data ingest and processing functions of the frame analyzer 110.

For example, the computing logic or software instructions can include sets of coded routines and/or proprietary protocols for receiving, processing, and exchanging data communications between the content rendering engine 108 and the media player 104, the device 102, or both. In some implementations, the content rendering engine 108 is configured to generate a control file 116 and the API 112 allows the system 100 to pass the control file to the media player 104 (or to device 102) for interfacing or integrating with proprietary software of the media player 104. The control file 116 is sometimes referred to alternatively as a configuration file 116.

The control file 116 is used to generate an example graphical interface of the content rendering engine 108 and to configure various controls, such as controls that can be included in this graphical interface. In some implementations, the control file 116 causes the controls of the content rendering engine 108 to be integrated with an example graphical interface of the media player 104. This is described in more detail below with reference to the example of FIG. 3. The controls are used, e.g., by a user, to adjust a rate at which individual frames of media content 114 are played back by the media player 104 and sequentially displayed as an output to a user via device 102. More specifically, the controls are used selectively to decrease a frame playback rate for a portion of the media content. For example, the controls can decrease or decrement the frame playback rate selectively as a function of at least one input value that is selectable by the user, e.g., a user-selectable input.

Figure 2:
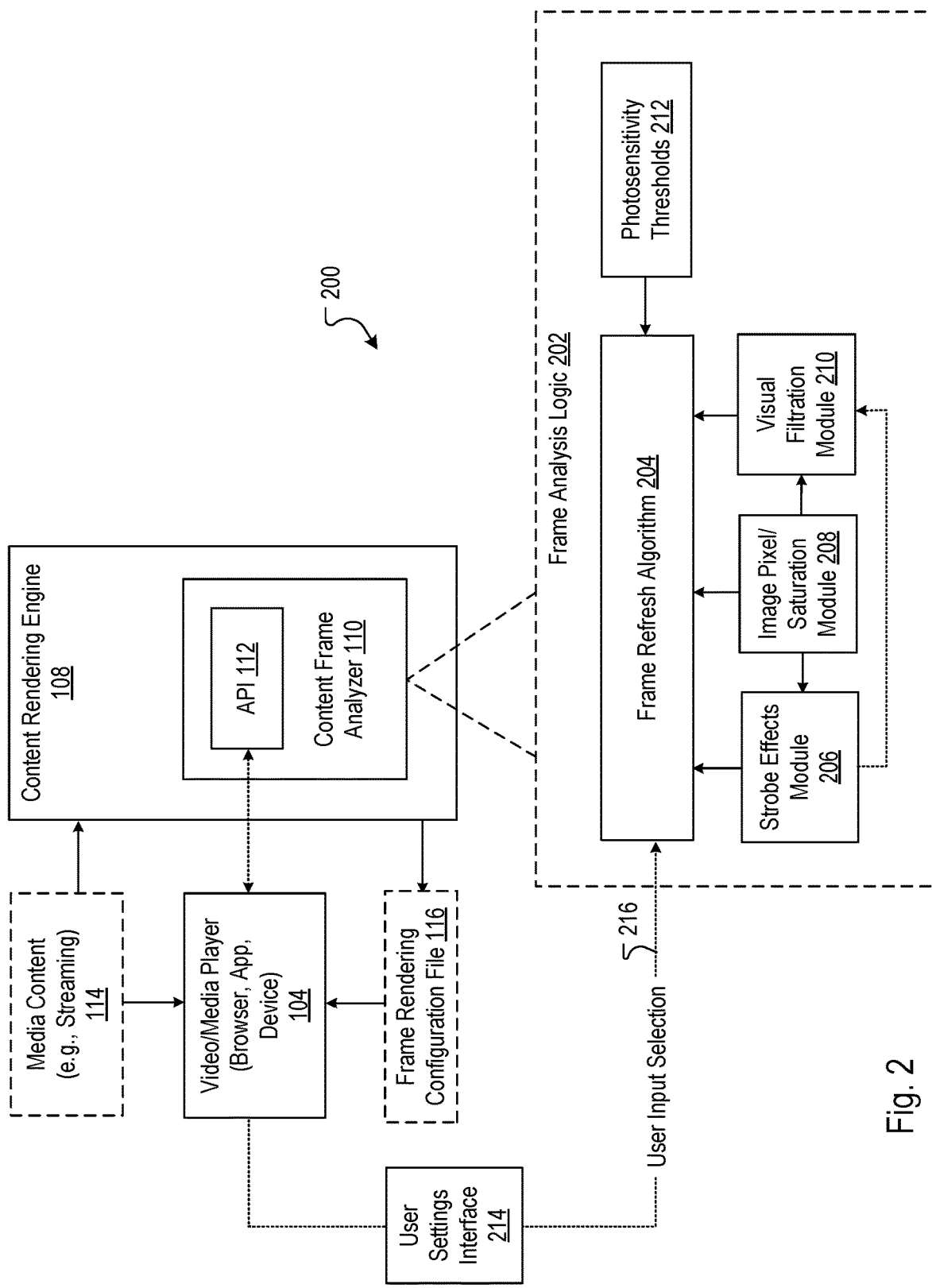
FIG. 2 is a block diagram showing example modules of a frame analysis logic included in a content frame analyzer of FIG. 1.

FIG. 2 is a block diagram showing example modules 200 of a frame analysis logic 202 included in a content frame analyzer 110 of the content rendering engine 108. As noted above, the frame analysis logic 202 of the content rendering engine 108 may be included among the compute logic/software instructions that are executable by the processors of the server 106. The frame analysis logic 202 generally includes a frame refresh algorithm 204, a strobe effects module 206, an image pixel processing module 208, and a visual filtration module 210.

The frame refresh algorithm 204 can embody a set of instructions for scanning, analyzing, or otherwise processing each of the individual frames of the media content, including the respective image content of each frame. The algorithm 204 receives inputs from each of the strobe effects module 206, the image pixel processing module 208, and the visual filtration module 210. The algorithm 204 also receives one or more photosensitivity thresholds 212 that provide threshold values for different comparative operations performed by the content rendering engine 108.

The algorithm 204 makes a determination about whether image content of a frame is unsafe to the user at least by calculating a value for one or more respective characteristics of a frame and then comparing a given value against a threshold value for a particular photosensitivity threshold. The characteristics calculated by content rendering engine 108 relate to a light or color attribute of the image content, as described more below. The algorithm 204 processes its input values in accordance with the frame analysis logic 202 and determines a safe video frame rate based on the results of the comparisons.

The system 100 can generate an example user settings interface 214 at a display output of the media player 104. The system 100 passes a control signal as an input 216 to the algorithm 204, where the input represents a value for a user-selectable input 216. In some implementations, the algorithm 204 determines whether to selectively decrease a frame playback rate for a portion of the media content 114 as a function of an input value 216 that is selectable by the user. The user-selectable input 216 can indicate a particular photosensitivity threshold 212 that corresponds to the user's photosensitivity. For example, the input 216 can indicate that a "low" photosensitivity threshold 212 should be applied when the algorithm 204 performs its computations to determine whether image content of a frame is unsafe to the user.

For each of the multiple frames in the video content, the content rendering engine 108 uses one or more of the modules 200 to calculate a value for a respective characteristic of image content in a frame and passes the value as an input to the algorithm 204. For example, the content rendering engine 108 calculates one or more parameter values for a strobe effect attribute using the strobe effects module 206, calculates one or more parameter values for a pixel color attribute using the image pixel module 208, and calculates one or more parameter values for filtering content of a frame using the visual filtration module 210.

The pixel color attributes calculated using the image pixel module 208 are attributes such as, pixel brightness, pixel color ratio, and pixel color saturation. The strobe effect attributes calculated using the strobe effects module 206 can be based on multiple flashes of light or other bright visual effects that occur rapidly and intermittently over a subset of frames in the media content. A certain portion of the effects can result in image content over two or more frames that shine in a bright but brief, sudden, or intermittent way. Hence, characteristics of image content calculated using the strobe effects module 206 or the image pixel module 208 can include a color ratio of the content, a color saturation of the content, or rapid occurring bright, visual effects.

The color ratio (or color contrast ratio) of image content is a characteristic that represents a ratio of the luminance of the brightest color (white) to that of the darkest color (black) that is present in the image content for a given region of a frame. Contrast ratios can range from 1 to 21 (written as 1:1 and 21:1). An example formula for obtaining a contrast ratio is: $(L1+0.05)/(L2+0.05)$. The first number, L1, refers to the relative luminance of light colors, whereas the second number, L2, refers to the relative luminance of dark colors. Thus, the color ratio is calculated using "relative luminance," which can be defined as the relative brightness of any point in a colorspace. In some implementations, the relative brightness can be normalized to 0 for darkest black and 1 for lightest white. The relative luminance can be calculated from any color code such as HEX or RGB.

As discussed above, image content can correspond to an item or region of an individual video frame. A frame that depicts a grassy plain with mountains and a cloudy sky includes respective image content for different regions of the grassy plain, the mountains, and the cloudy sky. For this example frame, the contrast ratio can indicate a sharp contrast in the luminance of the brightest shade to that of the darkest shade in a single frame as well as over two or more contiguous frames. This sharp contrast can indicate lightning strikes in a region of the sky above the mountains.

The algorithm 204 can receive different sets of calculated pixel values from module 208 that indicate a relative luminance observed in a frame. The algorithm 204 processes the values to determine that a portion of the media content 114 includes several frames that depict bright and rapid lightning strikes. For example, the algorithm 204 determines that the user-selectable input 216 indicates a photosensitivity threshold 212 of "medium" or "high" and compares the calculated pixel values for the relative luminance to the threshold pixel values of the photosensitivity threshold 212. The algorithm 204 executes its computations to perform the comparison, determines that pixel values for the relative luminance exceed the threshold pixel values, and determines that the image content with the lightning strikes is unsafe to the user.

The algorithm 204 can read or look at each pixel of the image content, determine a respective color saturation in the pixel or a change in the color saturation, and compare the saturation value (or saturation change value) to a threshold value. The algorithm 204 can perform this comparison across different arrays of pixel values and across multiple frames. The algorithm 204 causes the content rendering engine 108 to generate a flag that indicates a subset of pixel values across one or more frames exceeds a threshold saturation value.

In some implementations, the image pixel module 208 calculates parameter values for pixel color attributes and passes those values to the strobe effects module 206, the visual filtration module 210, or both. The strobe effects module 206 can also pass its calculated values to the visual filtration module 210. The visual filtration module 210 determines whether to filter a frame from the media content based on the detected strobe effects and relative luminance of the frame. For example, calculated values for detected strobe effects and relative luminance that exceed a particular threshold are indicative of frames that include sudden flashes and/or bright visual effects, such as laser light effects or lightning, that are unsafe for a certain user. The visual filtration module 210 processes its received values, generates an output based on the received values, and passes the output to the algorithm 204. The output may be a binary value for each frame that specifies one or more frames to be filtered from the media content.

The content rendering engine 108 uses the frame refresh algorithm 204 to generate the control file 116. As noted above, the control file 116 causes the controls of the content rendering engine 108 to be integrated with control functions of the media player 104. For example, the control file 116 causes controls for a user settings interface 214 to be integrated with an example graphical interface of the media player 104. In some implementations, the controls are used to generate control signals corresponding to input values that are passed as inputs to the frame analyzer 110. In some implementations, some (or all) of the frame analysis logic 202, including the algorithm 204, may be embedded in the control file 116, such that operations of the content rendering engine 108 may be integrated at the media player 104.

Figure 3:
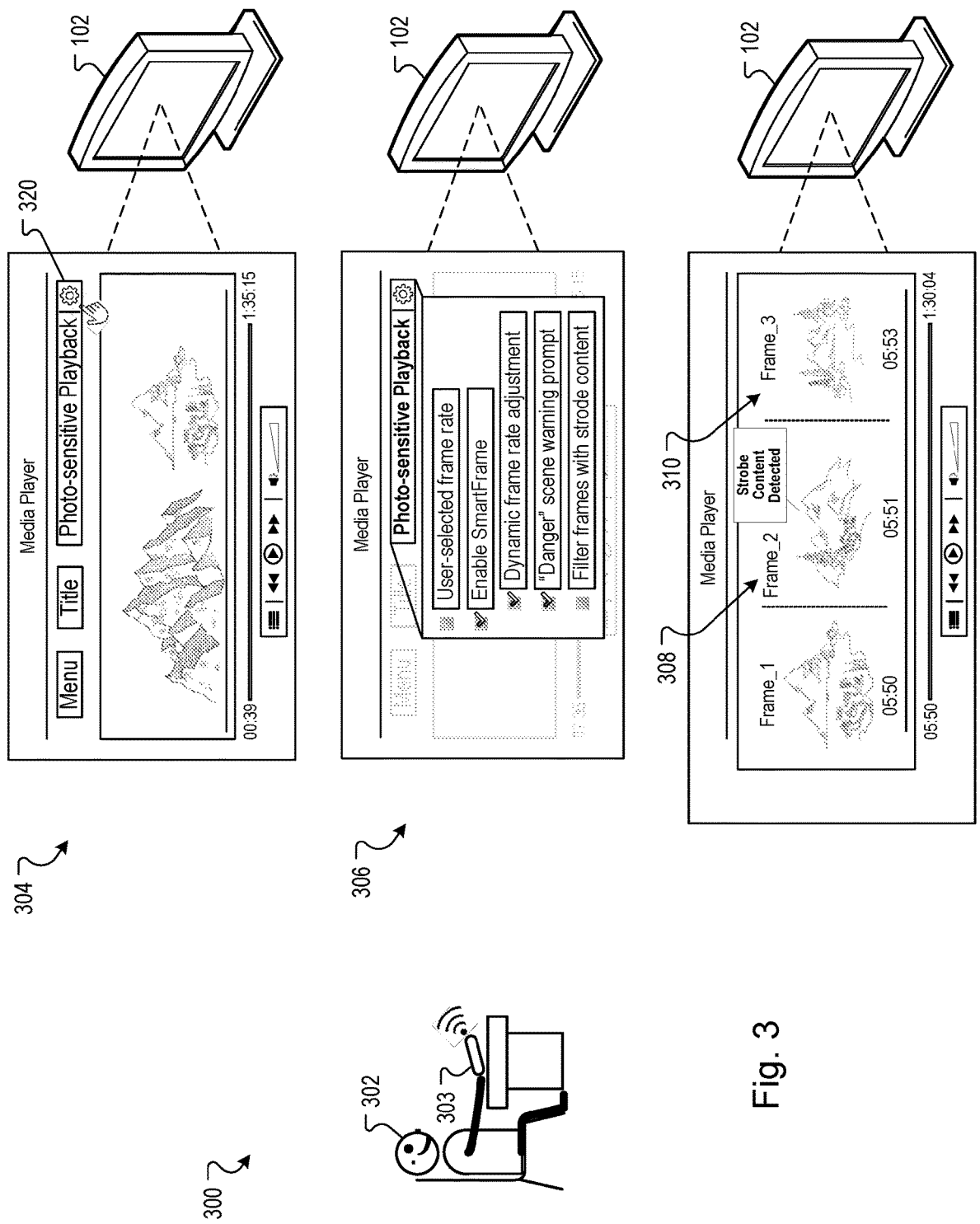
FIG. 3 shows examples of graphical interfaces of an example media player being presented to a user.

FIG. 3 shows examples of graphical interfaces 300 that can be presented to a user 302 based on at least the media player 104. As shown in the example of FIG. 3, the system 100 can generate a graphical interface that incorporates media controls or functions of the media player 104 as well as controls and functionality of the content rendering engine 108. The user 302 can interface with the graphical interface using an input device 303 (e.g., a remote or smartphone). In some implementations, the media player 104 generates a first graphical interface 304 having a first set of media controls, whereas the content rendering engine 108 can generate a second, different graphical interface 306 that has a second, different set of media controls.

In some implementations, the media controls of the graphical interface 306 are included or integrated with the media control features of the first graphical interface 304. Based on the configuration file 116, one or more controls of the content rendering engine 108 can be included in a single graphical interface with the controls of the media player 104, e.g., as an overlay to the controls of the media player 104. For example, the media player 104 can be integrated in a browser that is coded based on the HTML5, Hypertext Markup Language (HTML), browser standard. The controls of the content rendering engine 108 may integrate with the controls of the media player 104 based on the connectivity features of the HTML5 standard.

In some other implementations, in lieu of, or in addition to, being integrated in an example graphical interface, the controls may also integrate with software (e.g., proprietary software) of the media player 104 to automatically perform one or functions of the frame analyzer 110, including functions for adjusting the playback rate of the media content 114. For example, either the device 102 or media player 104 can download or receive a configuration file 116 that embeds control logic for the API 112. The receiving device uses the configuration file 116, including the API 112, to interface with controls of the content rendering engine 108.

Based on configuration file 116, the device 102 or media player 104 is operable to reconfigure video processing features of the media player 104 to automatically perform functions of the frame analyzer 110. For example, the controls of the content rendering engine 108 are configured to selectively decrease a frame playback rate for a portion of the media content 114 as a function of multiple inputs, including at least one input value that is selectable by the user.

To address this longstanding need which affects many people, the example of FIG. 3 and other disclosed embodiments relate to modifications of playback of media content that includes audio and video components, such as streaming video, video files, Blu-ray disks, DVDs (Digital Video Disks), and the like, which may be played by device 102, which may be a computer, smart device, set-top box, Blu-ray player, DVD player, projector, or the like.

For example, the user 302 may have photosensitive epilepsy that causes the user to experience a seizure when image frames of the media content are displayed to (and viewed by) the user sequentially at a frame rate that exceeds a threshold frame rate that is safe to the user. The modifications involve playing back the media content 114 with the video component presented as a series of still frames at a rate that a user suffering from photosensitivity can tolerate. In the example of FIG. 3, the frame rate for a portion of media content 114 that includes frame_2 (308) and frame_3 (310) may be selectively decreased to one frame per second or one frame per two seconds.

Figure 4:
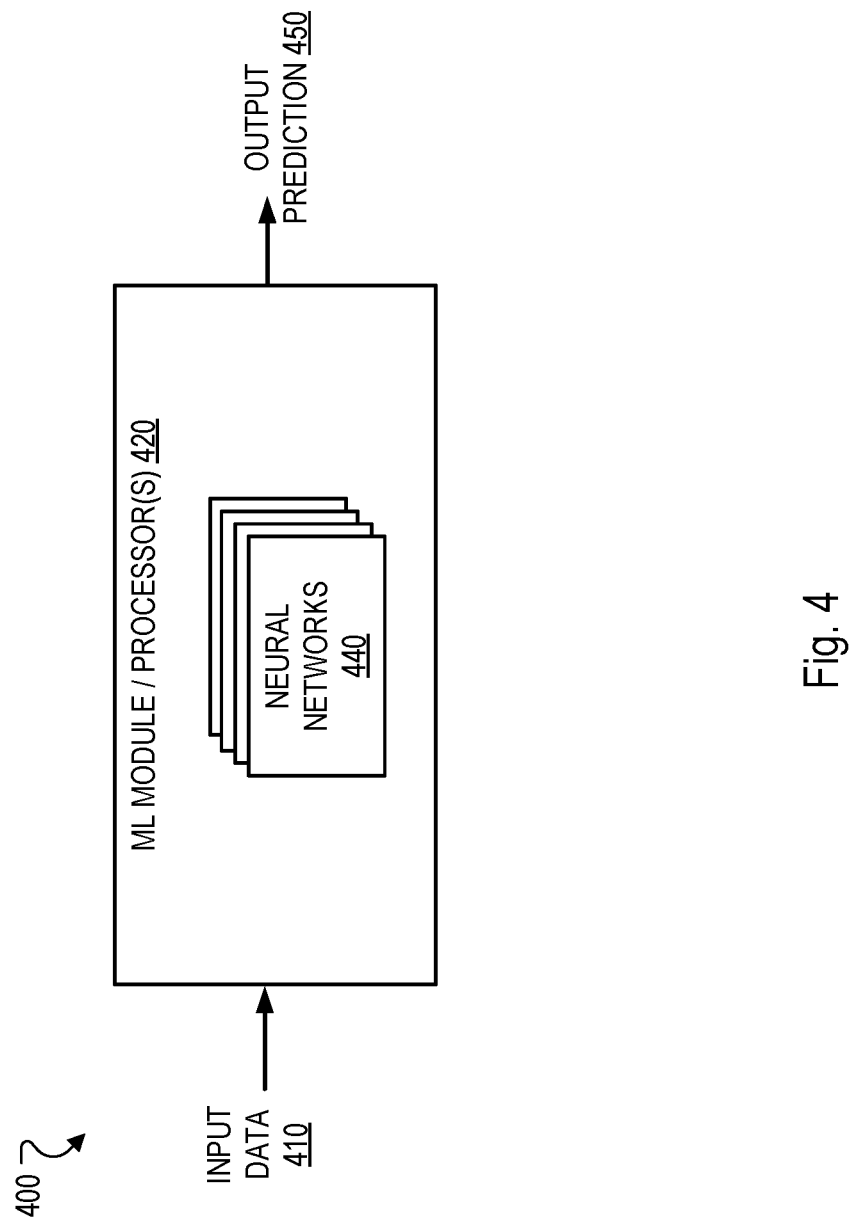
FIG. 4 is a block diagram of an example machine-learning system that processes individual frames of media content.

FIG. 4 is an example machine-learning system 400 ("ML system 400") for processing image content of individual frames of the video data in the media content 114. In some implementations, the functionality of the ML system 400 may be integrated with content rendering engine 108, and by extension with the media player 104. The ML system 400 can identify and process a large amount of image pixel-level data obtained from individual frames of the media content. The data is processed to detect pixel-level patterns that are indicative of bright, rapid flashing lights, strobing light effects, or contrasting light and dark patterns that may be unsafe for a viewer with photosensitivity epilepsy. The image pixel patterns may include local binary patterns (LBP), local ternary patterns (LTP), image texture patterns or any other suitable image pattern combinations and variations.

The image processing operations and algorithms of the ML system 400 are associated with program code or software instructions that are executable by special-purpose processors of the content rendering engine 108. For example, these processors may be neural network processors, graphics processing units (GPUs), or application-specific integrated circuits (ASICs) that perform computations related to neural network inference workloads, support vector machine workloads, or other related machine-learning tasks. In some implementations, algorithms are used to train a machine learning model to compute inferences related to image processing and item recognition.

In some instances, an example data model of the ML system 400 can be trained based on learned inferences or computations performed by a neural network, such as a convolutional neural network (CNN). The model can be trained to, for example, detect patterns or associations between image pixel values of an individual video frame and perform a comparison of those values with corresponding image pixel values of a prior or subsequent frame in a subset of frames. The detected patterns or associations can be used by the content rendering engine 108 to determine whether two or more contiguous frames of the media player 104 contain image content that is unsafe to the user.

In some implementations, the ML system 400 includes an example machine-learning module 420 that receives input data (images) 410. The ML module 420 can be implemented in software, hardware, or both. In some cases, the ML module 420 includes special-purpose hardware circuitry for implementing one or more machine-learning models. The hardware circuitry can represent a hardware accelerator or other special-purpose processor that performs computations for processing input images 410 using one or more neural networks 450 of the ML module 420.

Whether implemented in hardware or software, at least one of the neural networks 450 can be a CNN that analyzes image pixels for different regions of an image to detect patterns or attributes in the image, as well as to recognize one or more items in the image. The ML module 420 is operable to output predictions 450 about the contents of an input image or a series of input images based on inference computations performed by the CNN.

Figure 5:
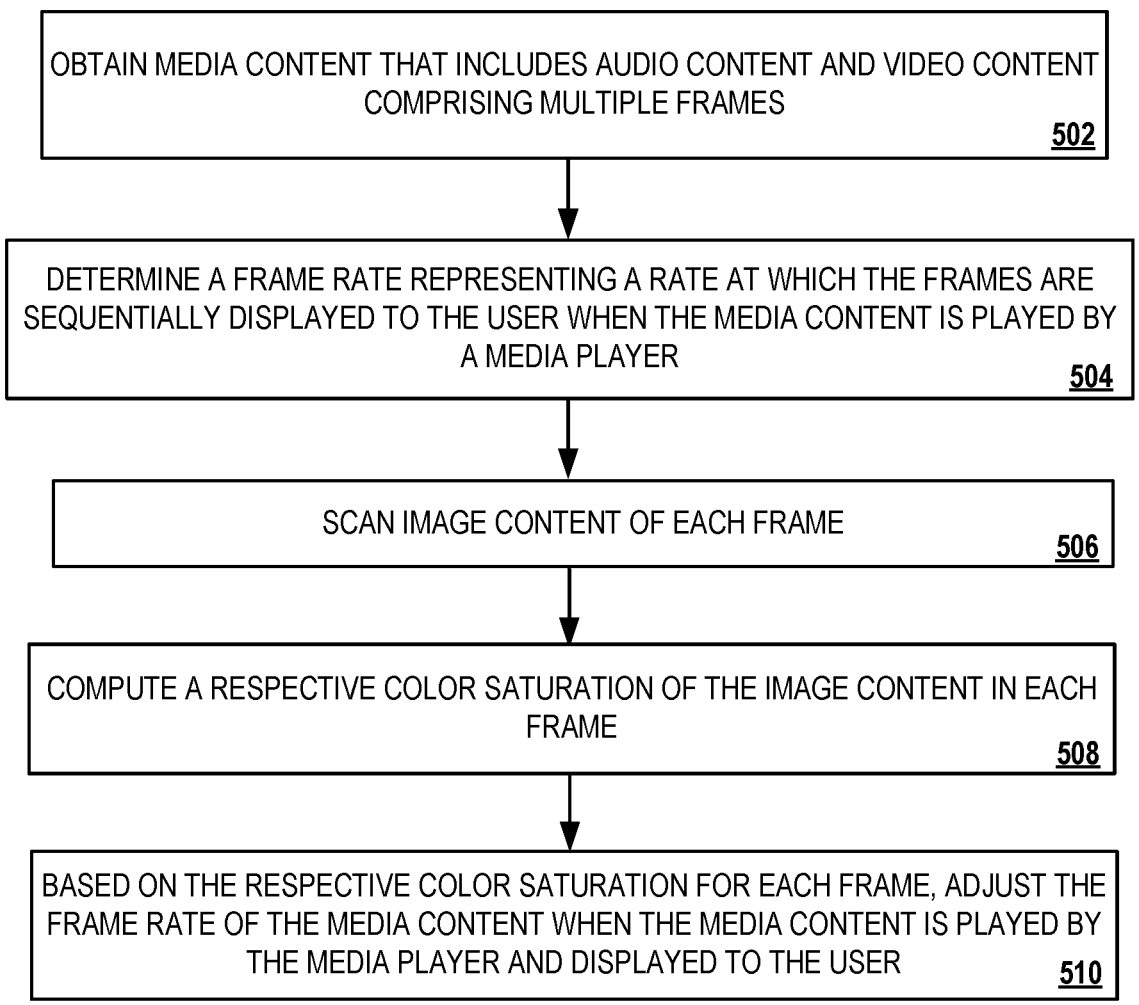
FIG. 5 is an example process for rendering image content as time-spaced frames.

FIG. 5 is an example process 500 for rendering image content as time-spaced frames by adjusting a frame rate for a portion of media content. Process 500 can be implemented using system 100, modules 200, as well as the ML system 400 described above. Descriptions of process 500 may reference one or more of the computing resources described in this document. In some implementations, the described actions of process 500 are enabled by computing logic or programmed instructions executable by a processor and memory of an example electronic device, such as server 106, the device 102, the media player 104, or a combination of these resources.

Referring now to processing 500, the system 100 obtains media content that includes video content and audio content (502). The audio content is based on an audio waveform and the server 106 can parse data corresponding to the audio waveform from the video content.

The video content includes multiple frames. The system 100 determines a frame rate representing a rate at which the multiple frames are sequentially displayed to the user when the media content is played by a media player (504). For example, the system 100 may determine that the unadjusted frame rate of the media content is 24 frames per second (fps). For each of the multiple frames, the system 100 scans image content of the frame (506). In some implementations, the system 100 scans the image content of each individual frame in response to processing an input image of the frame using CNN of the ML system 400 (described above).

Scanning the image content of the frame can include the content frame analyzer 110 determining a respective value of each pixel in a pixel array for the frame. The frame analyzer 110 identifies regions of the frame based on the value of each pixel in the pixel array for the frame. Based on an object detector of the ML system 400, the content frame analyzer 110 can detect a respective object of the image content in each of the one or more regions of the frame.

For each of the multiple frames, the system 100 computes a respective color saturation of the image content (508). The color saturation indicates an intensity of color in the frame or a particular amount of change in color intensity of an array of pixels in a frame. For example, the image pixel module 208 of the content rendering engine 108 can calculate a 95% change in color saturation of the pixels. This 95% change in color saturation may exceed a threshold saturation change value of 83% that is based on a photosensitivity threshold 212 used to indicate a lightning strike in a frame or laser light effects in an action sequence in a frame.

Based on the respective color saturation for each frame, the system 100 adjusts the frame rate of the media content when the media content is played by the media player and displayed to the user (510). For example, the frame analyzer 110 generates a configuration file 116 based at least on the respective color saturation in each frame. The configuration file causes the media player 104 to adjust the rate at which a subset of the frames is displayed to the user so as to not trigger an epileptic reaction from the user when the user views the subset frames as the media player plays the media content.

Based on the configuration file 116, the server 106 adjusts signal attributes of a portion of the audio waveform that includes audio that corresponds to the subset of frames and generates a modified portion of audio in response to adjusting the signal attributes. The configuration file 116 can include or specify an adjusted rate at which the subset of frames is to be displayed to the user and the system 100 synchronizes the modified portion of audio with the subset of the frames based on the adjusted rate.

Figure 6:
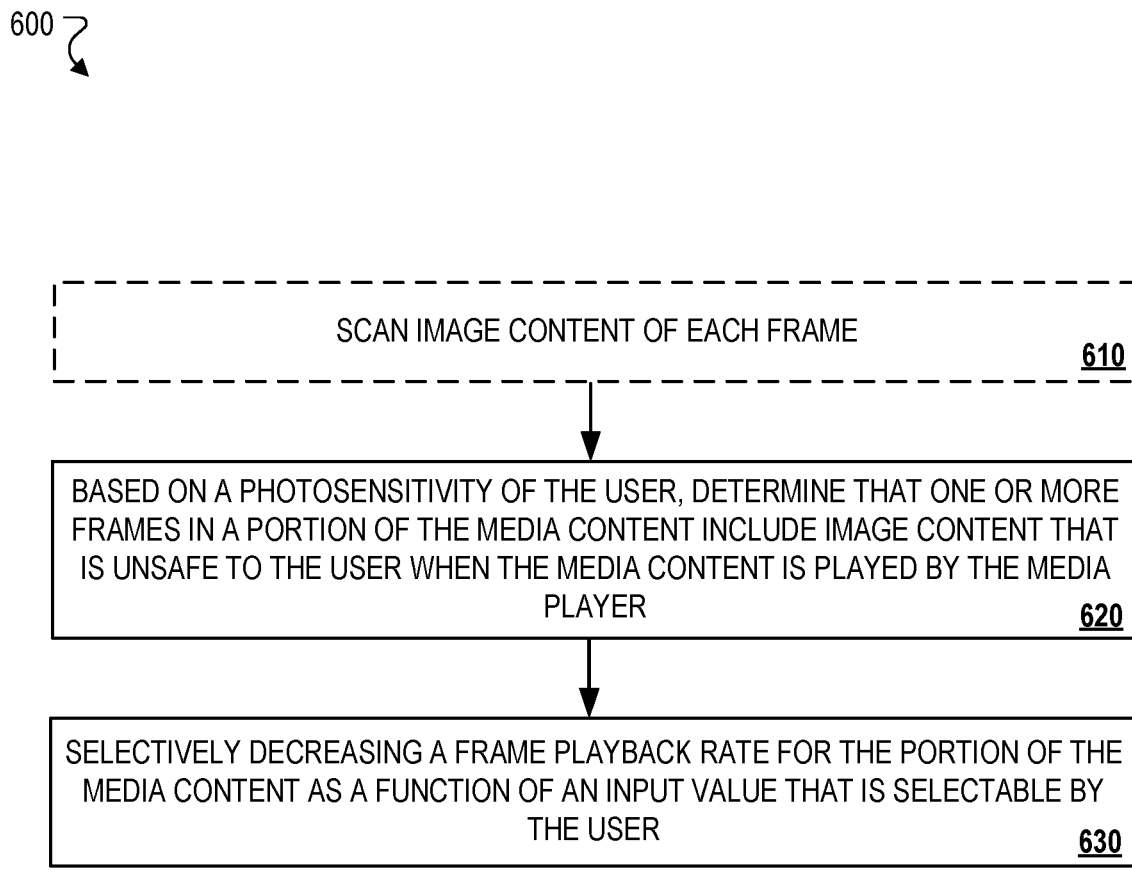
FIG. 6 is another example process for rendering image content as time-spaced frames.

FIG. 6 is an example process 600 for rendering a portion of media content as time-spaced frames by selectively decreasing a frame playback rate for the portion of the media content. The system 100 can optionally scan or rescan the image content of each frame of the media content as described above with reference to the example of FIG. 4 (610).

Based on a photosensitivity of the user, the system 100 determines that one or more frames in a portion of the media content include image content that is unsafe to the user when the media content is played by the media player (620). For example, the system 100 makes the determination regarding the image content being unsafe at least by calculating a value for a respective characteristic of a frame in the media content. More specifically, for each of the multiple frames in the video content, the content rendering engine 108 calculates a value for a respective characteristic of image content of a frame in the media content. For example, the pixel module 208 calculates pixel color values for different arrays or groupings of pixels across a video frame.

A respective characteristic is related to a light or color attribute of the image content. In some implementations, characteristics of the image content or the frame include a color ratio of the content, a color saturation of the content, or both. In some implementations, for each frame, the content rendering engine 108 calculates or computes various sets of parameter values that are descriptive of different reoccurring light patterns among the image content of the frame. For example, the parameter values can be different pixel color values, such as intensity or relative luminance, that are descriptive of rapid transitions of laser light effects or lightning flashes across multiple frames of the media content.

The system 100 determines that a respective value for a frame in the portion of media content exceeds a threshold value. The system 100 determines that the portion of media content includes image content that is unsafe to the user when the respective value for the frame exceeds the threshold value. For example, the content rendering engine 108 can determine that the portion of media content includes image content that is unsafe to the user when the respective value for the frame exceeds the threshold value.

The system 100 selectively decreases a frame playback rate for the portion of the media content as a function of an input value that is selectable by the user (630). The threshold value is based on the input value and is selectable by the user. The content rendering engine 108 is configured to restore a nominal frame playback rate of the media content in response to determining that the respective value for the characteristic of the frame no longer exceeds the threshold. The nominal playback rate is the frame rate prior to selectively decreasing the frame playback rate for the portion of the media content as a function of the input value.

According to some examples, the technique presents a graphical user interface (GUI) for displaying and controlling media content. In some examples, the GUI includes a control for setting a frame rate at which to render media content as a sequence of still frames. The frame rate may also be referred to herein as a frame length, which mathematically is the inverse of frame rate and represents an interval of time during which each frame is displayed before changing to a next frame. Users may operate the control to establish a desired frame length, based on their own photosensitivity. In a non-limiting example, frame length may be varied between 0.5 seconds and 10 seconds.

According to some examples, the technique may switch from one frame to the next in a gradual manner, which may include fading or superimposing of content. In some variants, the GUI provides one or more controls for selecting a frame transition scheme and setting its parameters. According to some other examples, the technique uses an algorithm 204 that analyzes video content and, in response to detecting an interval of stable video, displays the video at full frame rate during the stable interval, switching back to the user-established frame length at the end of the stable interval.

Embodiments of the disclosed techniques provide a set of program code that can be configured as a control file and integrated into any video or movie-streaming browser or application. The disclosed techniques provide users with photosensitivity the opportunity to view videos and movies without risk of photosensitive seizure. Users can apply predetermined settings to their video-viewing experience, enabling those with photosensitivity the ability to finally enjoy a cinematographic experience enjoyed by everyone else in the world.

The disclosed techniques provide a capability for displaying any video, movie, or media source through any mobile, personal, or other computerized device. Because the described coding and software techniques can be applied to any video display platform, no specific hardware requirements are necessary for this capability. Further, this capability provides users with photosensitivity a cinematographic experience utilizing coding and software that is not required to interact with, or depend on, existing photosensitive equipment or capabilities.

Every person with a form of photosensitivity has varying degrees of sensitivity to light and flashing. The disclosed techniques provide a way for individuals with photosensitivity to safely view videos and movies without fear of triggering epileptic seizures. The movies and videos displayed on an example browser, application, or through an existing video streaming source, can use the same pictures and audio normally shown during the video or movie.

In some implementations, instead of showing animation of the movie, the images on the screen would utilize still images of the video. In some cases, the images are stretched to a predetermined, safe length for the user, thereby reducing the risk of seizure due to flashing, light, or fast motion. The images on the screen would correlate with the audio being played so that the video content viewed by the user is synchronized with the audio content.

The primary customers and users of the disclosed techniques include any individuals with photosensitivity or families as a whole that are impacted by members with photosensitivity. Embodiments may be provided as a service by any video streaming source, movie provider, or organization that provides streaming services for video content. In some examples, software that implements the disclosed technique may be integrated through existing platforms for video streaming and may be manually configured to the user's preferred photosensitivity level.

The image provided above is an example of the web browser version of Photosensitive Cinema. Much like any media player, there are 'play', 'stop', 'fast forward', and 'rewind' options. Additionally, the site may provide a full screen version of the media and a side-by-side version of the media showcasing the capability alongside a normally played version (for demonstration purposes only). Additional user options include the ability to select the preferred frame length as well as any of the available movie options to watch (again, for demonstration purposes only).

Through software processes and user configuration, video content will be altered during presentation to the user. This software process will play audio content, unaltered, concurrently with video content that is metered such that a refresh of the screen happens only during the determined minimum safe duration. In some examples, specification of the frame length can be set automatically for any video media, based on a minimum refresh in seconds or milliseconds, or through the use of a preconfigured settings file that determines the best stop points for the particular media.

For video that has a settings file, the software will use an algorithm to determine the best stopping points that maintains a safe minimum safe duration, based on the user's preference for screen refresh. This settings file will be a non-proprietary, standards-compliant structure that can be easily created or modified for use with the software. In some examples, embodiments employ client-side software technologies that perform the described functions on the presentation layer (browser/app/computer) to ensure that it is not hardware-dependent; this maximizes the amount of platforms that can be reached.

This software technology process will also implement other methods and capabilities that are not related to screen refresh duration, including but not limited to visual color spectrum modification, shading/filtering, and similar capabilities.

Figure 7:
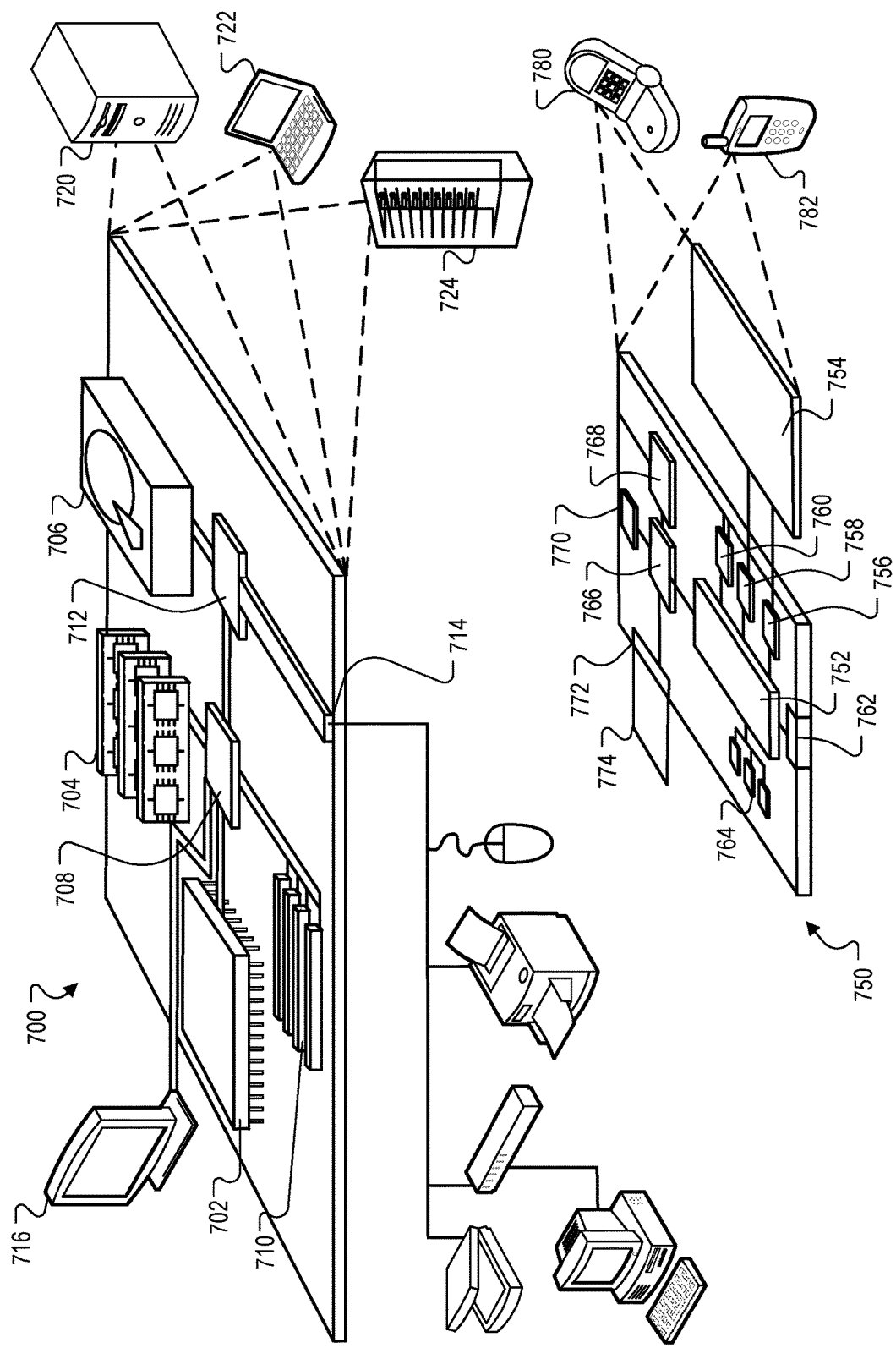
FIG. 7 is a block diagram of a computing system that can be used in connection with methods described in this specification.

FIG. 7 is a block diagram of computing devices 700, 750 that may be used to implement the systems and methods described in this document, either as a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

Various embodiments include software components that run on a media server platform, server-based software that accesses a media server platform but runs separately, client software that runs in a web browser or other client-side program, and/or software or firmware that runs on a specialized appliance, such as a modified Blu-ray player or DVD player. Other embodiments may be directed to a computer program product. The computer program product stores instructions which, when executed on control circuitry of a computerized apparatus, cause the apparatus to perform the technique described above. Such embodiments may coordinate with existing media streaming sources in support of individuals with photosensitivity.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As discussed above, systems and techniques described herein can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method that causes media content to be presented at a frame rate that is safe to a user, the method comprising:
   obtaining media content comprising video content and audio content, wherein the video content comprises a plurality of frames and wherein the audio content is based on an audio waveform;
   determining a frame rate representing a rate at which the plurality of frames are sequentially displayed to the user when the media content is played by a media player;
   for each of the plurality of frames:
     scanning image content of the frame; and
     computing a color saturation of the image content, wherein the color saturation indicates an intensity of color in the frame;
   generating a configuration file based on the respective color saturation in each frame;
   causing the media player to adjust the rate at which a subset of the plurality of frames is displayed to the user, based on the configuration file; and
   adjusting, based on the configuration file, signal attributes of a portion of the audio waveform comprising audio that corresponds to the subset of the plurality of frames.

2. The method of claim 1,
   wherein the configuration file causes the media player to adjust the rate at which the subset of the plurality of frames is displayed to the user so as to not trigger an epileptic reaction from the user when the user views the subset of the plurality of frames as the media player plays the media content.

3. The method of claim 2, further comprising:
   parsing data corresponding to the audio waveform from the video content;
   and
   generating a modified portion of audio in response to adjusting the signal attributes.

4. The method of claim 3, wherein the configuration file comprises an adjusted rate at which the subset of the plurality of frames is to be displayed to the user and the method further comprises:
   synchronizing the modified portion of audio with the subset of the plurality of frames based on the adjusted rate.

5. The method of claim 1, wherein the configuration file causes the media player to adjust the frame rate when the media content is played by the media player and presented at a display of an electronic device.

6. The method of claim 5, wherein the media player is integrated in the electronic device.

7. The method of claim 5, further comprising:
   generating an interface comprising a plurality of controls;
   detecting, based on one or more of the plurality of controls, an input that specifies selection of a frame transition scheme; and
   setting a parameter of the frame transition scheme based on the detected input.

8. The method of claim 5, wherein the media player communicates with the electronic device by way of a wired or wireless connection.

9. The method of claim 1, wherein scanning the image content of the frame comprises:

determining a respective value of each pixel in a pixel array for the frame;
identifying one or more regions of the frame based on the value of each pixel in the pixel array for the frame; and
detecting, based on an object detector, a respective object of the image content in each of the one or more regions of the frame.

10. The method of claim 9, wherein determining the color saturation of the frame comprises:
determining a respective color saturation for each object detected in each of the one or more regions of the frame, wherein the respective color saturation indicates an intensity of color associated with the object.

11. A system comprising a processing device and a non-transitory machine-readable storage device storing instructions that are executable by the processing device to cause performance of operations comprising:
obtaining media content comprising video content and audio content, wherein the video content comprises a plurality of frames and wherein the audio content is based on an audio waveform;
determining a frame rate representing a rate at which the plurality of frames are sequentially displayed to the user when the media content is played by a media player;
for each of the plurality of frames:
scanning image content of the frame; and
computing a color saturation of the image content, wherein the color saturation indicates an intensity of color in the frame;
generating a configuration file based on the respective color saturation in each frame;
causing the media player to adjust the rate at which a subset of the plurality of frames is displayed to the user, based on the configuration file; and
adjusting, based on the configuration file, signal attributes of a portion of the audio waveform comprising audio that corresponds to the subset of the plurality of frames.

12. The system of claim 11,
wherein the configuration file causes the media player to adjust the rate at which the subset of the plurality of frames is displayed to the user so as to not trigger an epileptic reaction from the user when the user views the subset of the plurality of frames as the media player plays the media content.

13. The system of claim 12, further comprising:
parsing data corresponding to the audio waveform from the video content;
and
generating a modified portion of audio in response to adjusting the signal attributes.

14. The system of claim 13, wherein the configuration file comprises an adjusted rate at which the subset of the plurality of frames is to be displayed to the user and the operations further comprise:
synchronizing the modified portion of audio with the subset of the plurality of frames based on the adjusted rate.

15. The system of claim 11, wherein the configuration file causes the media player to adjust the frame rate when the media content is played by the media player and presented at a display of an electronic device.

16. The system of claim 15, wherein the media player is integrated in the electronic device and the operations further comprise:
generating an interface comprising a plurality of controls;
detecting, based on one or more of the plurality of controls, an input that specifies selection of a frame transition scheme; and
setting a parameter of the frame transition scheme based on the detected input.

17. The system of claim 15, wherein the media player communicates with the electronic device by way of a wired or wireless connection.

18. The system of claim 11, wherein scanning the image content of the frame comprises:
determining a respective value of each pixel in a pixel array for the frame;
identifying one or more regions of the frame based on the value of each pixel in the pixel array for the frame; and
detecting, based on an object detector, a respective object of the image content in each of the one or more regions of the frame.

19. The system of claim 18, wherein:
determining the color saturation of the frame comprises:
determining a respective color saturation for each object detected in each of the one or more regions of the frame, wherein the respective color saturation indicates an intensity of color associated with the object.

20. A media player that renders media content at a frame rate that is safe to a user, the media player being configured to:
obtain media content comprising video content and audio content, wherein the video content comprises a plurality of frames and wherein the audio content is based on an audio waveform;
determine a frame rate representing a rate at which the plurality of frames are sequentially displayed to the user when the media content is played by the media player;
scan image content of each frame of the plurality of the frames and generate a configuration file based on a color saturation in each frame;
determine that a subset of frames in a portion of the media content include image content that is unsafe to users of a particular level of photosensitivity when the media content is played by the media player;
selectively decrease a frame playback rate for the subset of frames as a function of an input value that is selectable by the user; and
adjust, based on the configuration file, signal attributes of a portion of the audio waveform comprising audio that corresponds to the subset of the plurality of frames.

* * * * *